(12) United States Patent
Zarenin et al.

(10) Patent No.: US 7,979,898 B2
(45) Date of Patent: Jul. 12, 2011

(54) SYSTEM AND METHOD FOR MONITORING AND CONTROLLING SOFTWARE USAGE IN A COMPUTER

(75) Inventors: Alex Zarenin, Montclair, NJ (US); Anatoliy Belugin, New Windsor, NY (US); Iouri Bernadskii, Verona, NJ (US)

(73) Assignee: Barclays Capital Inc., New York, NY (US)

( * ) Notice: Subject to any disclaimer, the term of this patent is extended or adjusted under 35 U.S.C. 154(b) by 1099 days.

(21) Appl. No.: 11/272,161

(22) Filed: Nov. 10, 2005

(65) Prior Publication Data

US 2006/0107256 A1 May 18, 2006

Related U.S. Application Data

(60) Provisional application No. 60/626,985, filed on Nov. 10, 2004.

(51) Int. Cl.
*G06F 17/30* (2006.01)
*G06F 9/44* (2006.01)

(52) U.S. Cl. ............... 726/7; 726/17; 717/168; 717/170

(58) Field of Classification Search .......... 717/168–178; 709/201, 223–226; 726/22, 26, 7, 17
See application file for complete search history.

(56) References Cited

U.S. PATENT DOCUMENTS

| | | | |
|---|---|---|---|
| 5,155,847 A * | 10/1992 | Kirouac et al. | 709/221 |
| 5,790,664 A | 8/1998 | Coley et al. | 380/4 |
| 5,867,714 A * | 2/1999 | Todd et al. | 717/172 |
| 5,901,320 A * | 5/1999 | Takahashi et al. | 717/170 |
| 5,995,982 A * | 11/1999 | Mercer | 707/203 |
| 6,021,438 A | 2/2000 | Duvvoori et al. | 709/224 |
| 6,098,098 A | 8/2000 | Sandahl et al. | |
| 6,266,773 B1 | 7/2001 | Kisor et al. | |
| 6,662,205 B1 | 12/2003 | Bereiter | 709/201 |
| 7,120,429 B2 * | 10/2006 | Minear et al. | 455/419 |

(Continued)

FOREIGN PATENT DOCUMENTS

EP    1 457 885 A    9/2004

(Continued)

OTHER PUBLICATIONS

Notice of Reasons for Rejection; Application No. 2007-541358; Mailing No. 633113; Mailing Date: Sep. 7, 2010 (11 pages).

(Continued)

*Primary Examiner* — Jennifer N To
(74) *Attorney, Agent, or Firm* — Morgan Lewis & Bockius LLP

(57) ABSTRACT

Methods and systems for providing real-time reporting of software usage includes an agent running on a local computer. The agent identifies new processes started on the computer and checks the new process against a restricted list. If the new process is on the restricted list, the agent automatically performs one or more restriction actions associated with the executable name of the process. The restricted list is contained in a configuration file stored on the local computer. A master configuration file for the local computer is stored on a server and replaces the configuration file when the configuration file is outdated. An authorized administrator may edit the master configuration file by adding or removing executable and DLL names from the restricted list and by adding or removing restriction actions associated with the executable and DLL names on the restricted list.

12 Claims, 4 Drawing Sheets

U.S. PATENT DOCUMENTS

| | | | |
|---|---|---|---|
| 7,257,584 B2 * | 8/2007 | Hirschfeld et al. | 707/10 |
| 7,320,087 B2 * | 1/2008 | Sato et al. | 714/6 |
| 7,356,836 B2 * | 4/2008 | Beilinson et al. | 726/4 |
| 7,376,971 B2 * | 5/2008 | Pastorelli et al. | 726/26 |
| 7,613,284 B2 * | 11/2009 | New | 379/93.12 |
| 2002/0174359 A1 | 11/2002 | Haltmeyer | |
| 2003/0149756 A1 * | 8/2003 | Grieve et al. | 709/223 |
| 2003/0191911 A1 | 10/2003 | Kleinschnitz et al. | 711/154 |
| 2003/0196119 A1 * | 10/2003 | Raley et al. | 713/201 |
| 2004/0003266 A1 | 1/2004 | Moshir et al. | 713/191 |
| 2004/0003279 A1 * | 1/2004 | Beilinson et al. | 713/200 |
| 2004/0006586 A1 * | 1/2004 | Melchione et al. | 709/201 |
| 2004/0133801 A1 * | 7/2004 | Pastorelli et al. | 713/200 |
| 2004/0181788 A1 | 9/2004 | Kester et al. | |
| 2004/0243834 A1 * | 12/2004 | Stefik et al. | 713/200 |
| 2005/0027846 A1 | 2/2005 | Wolfe et al. | 709/223 |
| 2005/0114176 A1 | 5/2005 | Dominick et al. | 705/2 |
| 2005/0183143 A1 * | 8/2005 | Anderholm et al. | 726/22 |
| 2005/0209878 A1 * | 9/2005 | Fujino et al. | 705/1 |
| 2006/0080656 A1 | 4/2006 | Cain et al. | 717/174 |
| 2007/0061450 A1 | 3/2007 | Burnley et al. | 709/224 |
| 2007/0150524 A1 * | 6/2007 | Eker et al. | 707/203 |

FOREIGN PATENT DOCUMENTS

| | | |
|---|---|---|
| EP | 1 542 115 A | 6/2005 |
| JP | 2004-280831 A1 | 10/2004 |
| JP | 2004-302953 A | 10/2004 |
| WO | WO 03/036476 A | 5/2003 |

OTHER PUBLICATIONS

Communication Pursuant to Article 94(3) EPC, EP Application No. 05819991.0, dated Jul. 19, 2010 (6 pages).

Communication Pursuant to Rule 62 EPC, EP Application No. 05819991.0, dated Mar. 24, 2009 (9 pages).

Notification Of Transmittal Of The International Search Report And The Written Opinion Of The International Searching Authority, Or The Declaration, International Application No. PCT/US05/40953, Aug. 17, 2007 (9 pages).

"Cluster Command & Control (C3) Tool Suite"; Brim, et al; Computer Science & Mathematics Division Oak Ridge National Laboratory; (2000) (20 pages).

"Network-Embedded Programmable Storage and Its Applications"; Sobti, et al, Networking, 1143-1155 (2004) (13 pages).

"The rsync algorithm"; Andrew Tridgell, Paul Mackerras; Department of Computer Science Australian National University, Canberra; Nov. 9, 1998; 10 pages.

* cited by examiner

SYSTEM AND METHOD FOR MONITORING AND CONTROLLING SOFTWARE USAGE IN A COMPUTER

CROSS-REFERENCE TO RELATED APPLICATIONS

This application claims the benefit of prior filed U.S. provisional patent application No. 60/626,985, filed Nov. 10, 2004, which is incorporated herein by reference.

BACKGROUND OF THE INVENTION

1. Field of the Invention

The present invention relates to methods and systems for managing large global computer networks. More specifically, the invention relates to methods and systems for monitoring software used within the computer network and for enforcing software use policies of the computer network.

2. Description of the Related Art

Companies with large, geographically dispersed computer networks can reduce the licensing fees paid to software vendors by buying only enough licenses to cover the concurrent use of the software across the company. In order to comply with license agreements, the company must be able to monitor software use across the entire organization. Third party software monitoring programs such as, for example, the SMS 2003 product available from Microsoft Corporation of Redmond, Wash. enable a company to comply with the license agreement by monitoring the number of instances of the software executing on the network's computers. The SMS 2003 product, however, is site oriented, which makes monitoring over a geographically dispersed network difficult. Furthermore, current software monitoring packages only monitor usage but cannot enforce license policies. Therefore, there remains a need for methods and systems that can monitor software usage across a geographically dispersed computer network and enforce software policies.

SUMMARY OF THE INVENTION

Methods and systems for providing real-time reporting of software usage include an agent running on a local computer. The agent identifies new processes started on the computer and checks the new process against a restricted list. If the new process is on the restricted list, the agent automatically performs one or more restriction actions associated with the executable name of the process. The restricted list is contained in a configuration file stored on the local computer. A master configuration file for the local computer is stored on a server and replaces the configuration file when the configuration file is outdated. An authorized administrator may edit the master configuration file by adding or removing executable and DLL names from the restricted list and by adding or removing restriction actions associated with the executable and DLL names on the restricted list.

One embodiment of the present invention is directed to a method for monitoring software usage on a computer, the method comprising: running an agent program on the computer; identifying a new process executing on the computer; comparing the new process to a restricted list stored in a configuration file on the computer; and performing a restriction action on the new process if the new process is on the restricted list.

Another embodiment of the present invention is directed to system comprising: a computer in communication with a server; a configuration file stored on the computer, the configuration file including a restricted list, each entry in the restricted list comprising an executable name and a restriction action; and an agent program executing on the computer, the agent configured to identify a new process executing on the computer and perform the restriction action when the new process matches the executable name on the restricted list.

BRIEF DESCRIPTION OF THE DRAWINGS

The invention will be described by reference to the preferred and alternative embodiments thereof in conjunction with the drawings in which.

DETAILED DESCRIPTION

The description herein should be understood to describe only one preferred embodiment of the invention. Those skilled in the art will recognize, for example, that the described embodiment is just one simplified example of the novel system and method of metering software. The simplified example is all that needs to be described in detail in order to enable the more general system and method that the invention comprises.

Figure 1:
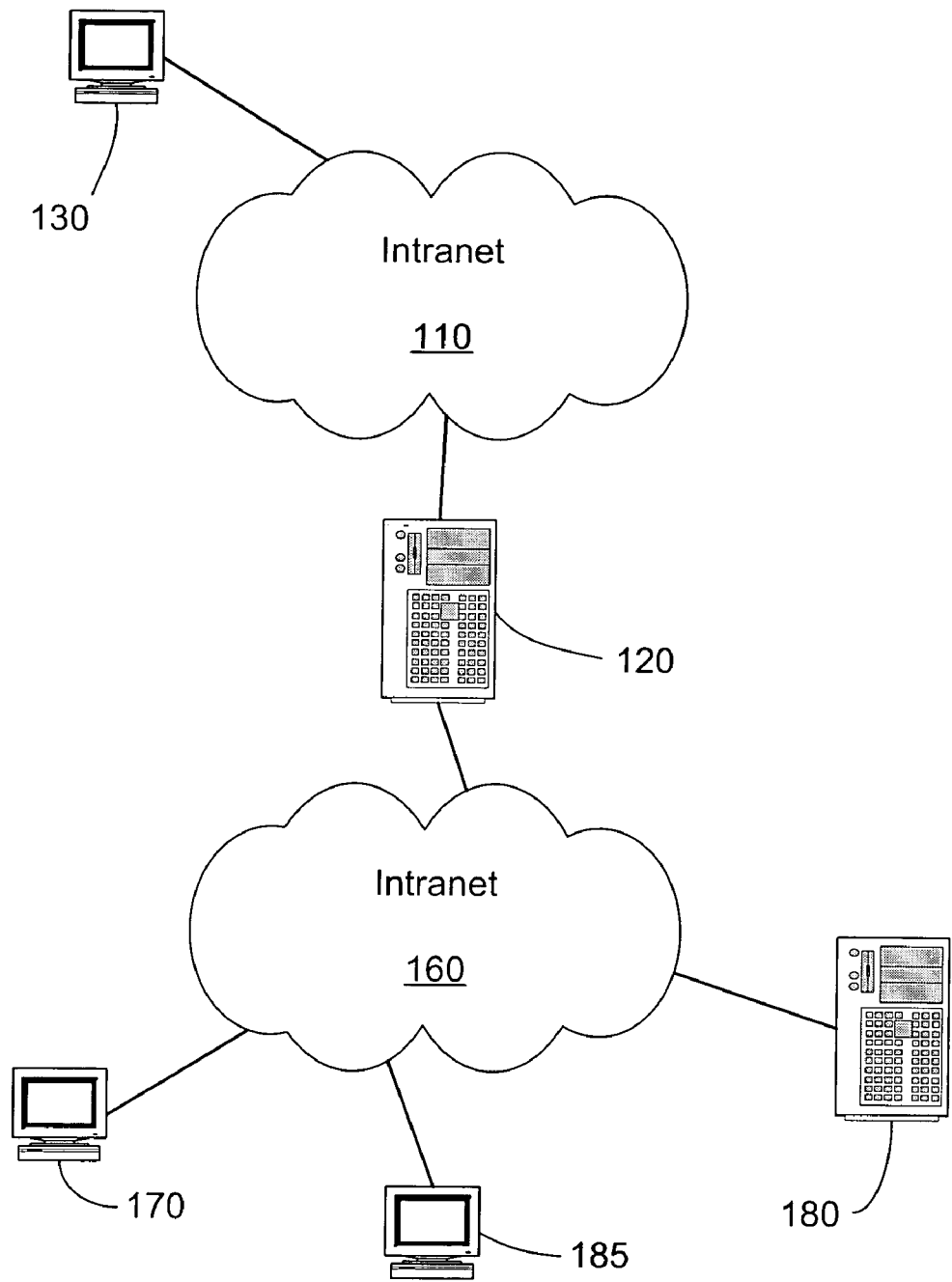
FIG. 1 is a diagram illustrating an exemplar computer network in an embodiment of the present invention.

FIG. 1 is a diagram illustrating an exemplar computer network that may be used by a company with one or more geographically distinct sites. An intranet 110 may be used to connect computers at a specific geographic site. A second intranet 160 may be used to connect computers at the same site as the first intranet 110 or may be used to connect computers at a second geographic site. A firewall 120 may be used to isolate and protect intranets 110 and 160 from each other in case one of the intranets is compromised. An internal firewall 120 may be used to protect high value company assets and provide a defense-in-depth against internal or external attacks. In other embodiments, intranet 110 may be connected to intranet 160 through an external network such as, for example, the internet. In a preferred embodiment, all connections to the external network are through firewalls.

In FIG. 1, computers 130 and 170 may be used by employees of the company to perform various tasks for the company. Each computer may be loaded with software that requires a license when used by a user. In a preferred embodiment, each computer stores an agent program in its non-volatile memory such as, for example, a hard disk. The agent program is configured to load automatically during the boot-up of the computer such that the agent program runs while the computer is operating. When the computer user starts a program, the agent program checks the new program against one or more restricted program lists stored in the agent's configuration file. If the new program is on the restricted program list, the agent executes a restriction action corresponding to the restricted program list.

In a preferred embodiment, the restricted program lists are stored in a configuration file that is read by the agent program. The configuration file may be locally stored on the computer and may be stored on a central server 180. The centralized server 180 preferably stores a master configuration file for each computer in the company's network and provides a central location for managing and administering the master configuration files. An authorized manager or administrator may update the master configuration files by editing the files through the manager/administrator's computer 185. The manager/administrator may assign a master configuration file to one or more computers that may be grouped according to work function or work group.

In a preferred embodiment, the agent program calculates a checksum for the configuration file stored on its computer and sends the checksum to the central server. The server receives the checksum from the computer and compares the checksum to a checksum for the master configuration file for the computer that is stored in the server. If the checksums do not match, the configuration file on the computer is invalid and the server pushes the master configuration file to the local computer for use as the configuration file. The master configuration file usually contains the most recent updates made by the manager/administrator thereby enabling each agent to use the most current information. The sending and comparing of configuration file checksums reduces network traffic because the master configuration file is transmitted over the network only when the local configuration file is outdated.

Each configuration file includes one or more restricted lists containing a list of executable module names. If the agent finds a new process executing on the local computer that matches one of the module names in the restricted lists, the agent performs a restriction action corresponding to that restricted list. For example, the configuration file may contain a restricted list named "KILL" wherein the agent terminates the process if it is on the KILL list. Similarly, the configuration file may contain a restricted list named "IGNORE" wherein the agent allows a process on the IGNORE list to continue execution on the local computer. Other examples of restricted lists and their associated restriction actions include, without being exhaustive, a "MAIL" list wherein the agent mails a message to interested parties when a process on the MAIL list is started, a "NOTIFY" list wherein the agent displays a configurable message for the user when a process on the NOTIFY list is started, a "REPORT" list wherein the agent reports the starting of a process on the REPORT list, and a "DISABLENET" list wherein the agent disconnects the local computer from the network whenever a process that is on the DISABLENET list is started. The local computer may be disconnected from the network by unlinking the TCP/IP stack from the local computer's network card. The agent may be directed to perform more than one restriction action by simply including the module name in each of the restricted lists corresponding to the desired restriction actions. For each configuration file, the manager/administrator may add or remove an executable file or DLL to or from one or more restricted lists in the configuration file. In a preferred embodiment, each restriction action may be a pre-compiled function within the agent.

In some embodiments, the configuration file may include a single restricted list wherein each entry on the list includes an executable and/or DLL name and one or more restriction actions that the agent performs if the new process matches the name on the restricted list. Each executable or DLL name may have different restriction actions associated with each name thereby allowing for greater customization of the automated actions performed by the agent when a process is found on the restricted list.

The use of restricted lists and their associated restriction actions allow for greater customization and granularity while decreasing the volume of network traffic generated by the agents. The volume of network traffic generated by the agents can become a significant issue in a large company network having tens of thousands of computers. The use of restricted lists-reduces network traffic by limiting agent reporting to only those events that are of concern to the administrator. Network traffic is further reduced by only transmitting configuration files when the configuration file on the local computer is outdated instead of transmitting the configuration file to the local computer each time the local computer starts. Compression/encryption methods such as, for example, Huffman encoding or DAWG (Directed Acyclic Word Graph) may also be used to reduce the size of the transmitted configuration files and any reports sent to the central server.

In a preferred embodiment, reporting by the agents is done in real-time, which enables a central repository to have immediate and up-to-date information of the software being executed in the company. Besides providing current software usage, real-time reporting also facilitates in-depth security analysis, performance analysis, failure analysis, and other network support functions.

Real-time reporting, however, usually relies on other network services such as, for example, load balancing, failover, and proximity distribution to provide full 24/7 availability of the central repository where reports from the company's computers are collected and stored. In addition, real-time reporting should work within the context of the company's network security administration. For example, some third-party packages use a network drive mapping method to connect the local computer to the server. Network drive mapping, however, is practically incompatible with operation through internal firewalls. Similarly, some third-party packages connect to the server via TCP/IP on a specific port. Connections via TCP/IP on a specific port, however, usually require special configurations on firewalls, which may open unintended and undetected security holes through the firewall.

In a preferred embodiment, bi-directional communication between the local computer and the central server is established via HTTP protocol on standard port 80. The use of HTTP/port 80 minimizes the disruption to other aspects of the company's network such as security while leveraging advanced WEB-based services that are aware of HTTP/port 80. The advantage of using port 80 for communication is that most firewalls are configured to allow this traffic and do not require elaborate analysis or custom configuration of the firewall. Furthermore, WEB-based services such as load balancing, redundancy and failover, and proximity distribution, which are usually specifically hardened against attacks on this protocol/port combination, become available to embodiments of the invention.

Figure 2:
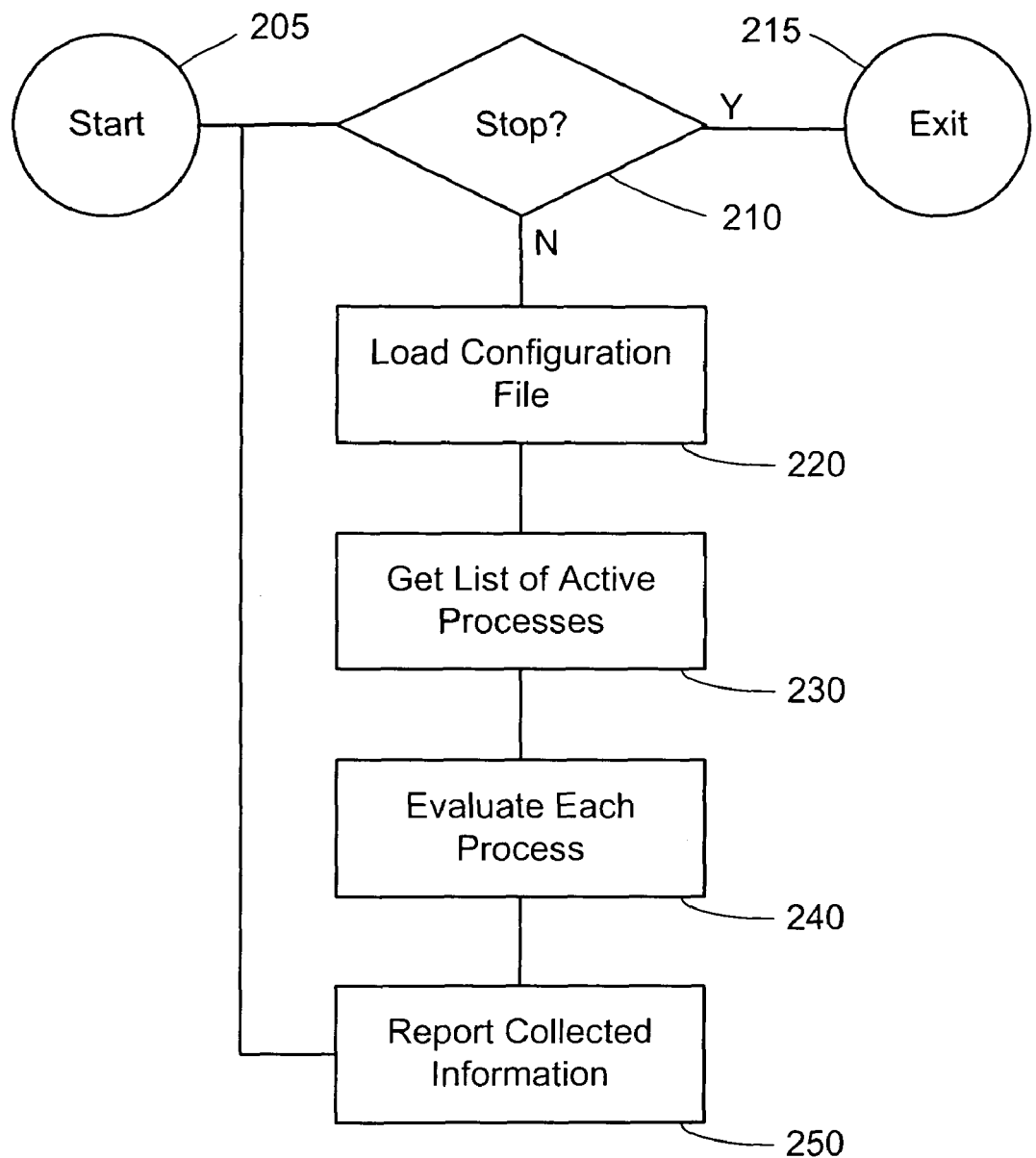
FIG. 2 is a flow diagram illustrating the operation of an agent in an embodiment of the present invention.

FIG. 2 is a flow diagram illustrating the operation of an agent in an embodiment of the present invention. In a preferred embodiment, the agent is configured as a native Windows service such that the agent starts in step 205 during boot-up of the local computer and can execute even when no user is logged into the system. Although Windows services are described with respect to FIG. 2, one of ordinary skill in the art should understand that the Windows services described below do not limit the methods and systems described to Windows platforms but may also be applied to non-Windows platforms such as, for example, Linux or Solaris and are within the scope of the present invention.

In step 210, the agent checks if a stop signal has been received from the operating system. If a stop signal has been received, the agent exits and terminates the agent program in step 215.

If a stop signal has not been received, the agent loads the most recent configuration file for the local computer in step 220. In step 220, the agent program calculates a checksum for the configuration file stored on its computer and sends the checksum to the central server. The server receives the checksum from the local computer and compares the checksum to a checksum for the corresponding configuration file stored in the server. If the checksums do not match, the server pushes the corresponding configuration file stored in the server to the local computer. The corresponding configuration file usually contains the most recent updates made by the manager/administrator thereby enabling each agent to use the most current information. The sending and comparing of configuration file checksums reduces network traffic because the configuration file is transmitted over the network only when the local configuration file is outdated.

In step 230, the agent retrieves a list of all active processes executing on the local computer from the operating system. The agent maintains the list of active processes, periodically retrieves a new list of active processes, and compares the two lists. If no new processes have appeared on the new list, the agent waits for a predetermined period before retrieving a new list of active processes from the operating system. If a new process has appeared on the new list, the agent evaluates the new process in step 240. Evaluation of the new process includes identifying the new process, checking the process against one or more restricted lists and executing a restriction action associated with a restricted list whenever the process is on that list. The agent may also evaluate any modules spawned by the process and compare the modules against the restricted lists. The agent may also collect additional information specified in the configuration file for each process and its associated modules.

In step 250, the agent may transmit a report to a central repository. Each report preferably covers a single executable and its associated modules such as, for example, DLLs. Each report is transmitted when the process evaluation is complete and provides for essentially real-time reporting of processes executing on the local computer. The report may use an existing server management infrastructure such as, for example, the System Management Server (SMS) available from Microsoft Corporation of Redmond, Wash. to transmit the report to an SMS server. Alternatively, the agent may use the network's Web services to send an XML formatted report to a SQL database repository for central storage.

After a report is transmitted to the central repository, the agent jumps back to step 210 to repeat the loop 210-220-230-240-250 until a stop signal is received from the operating signal.

Figure 3:
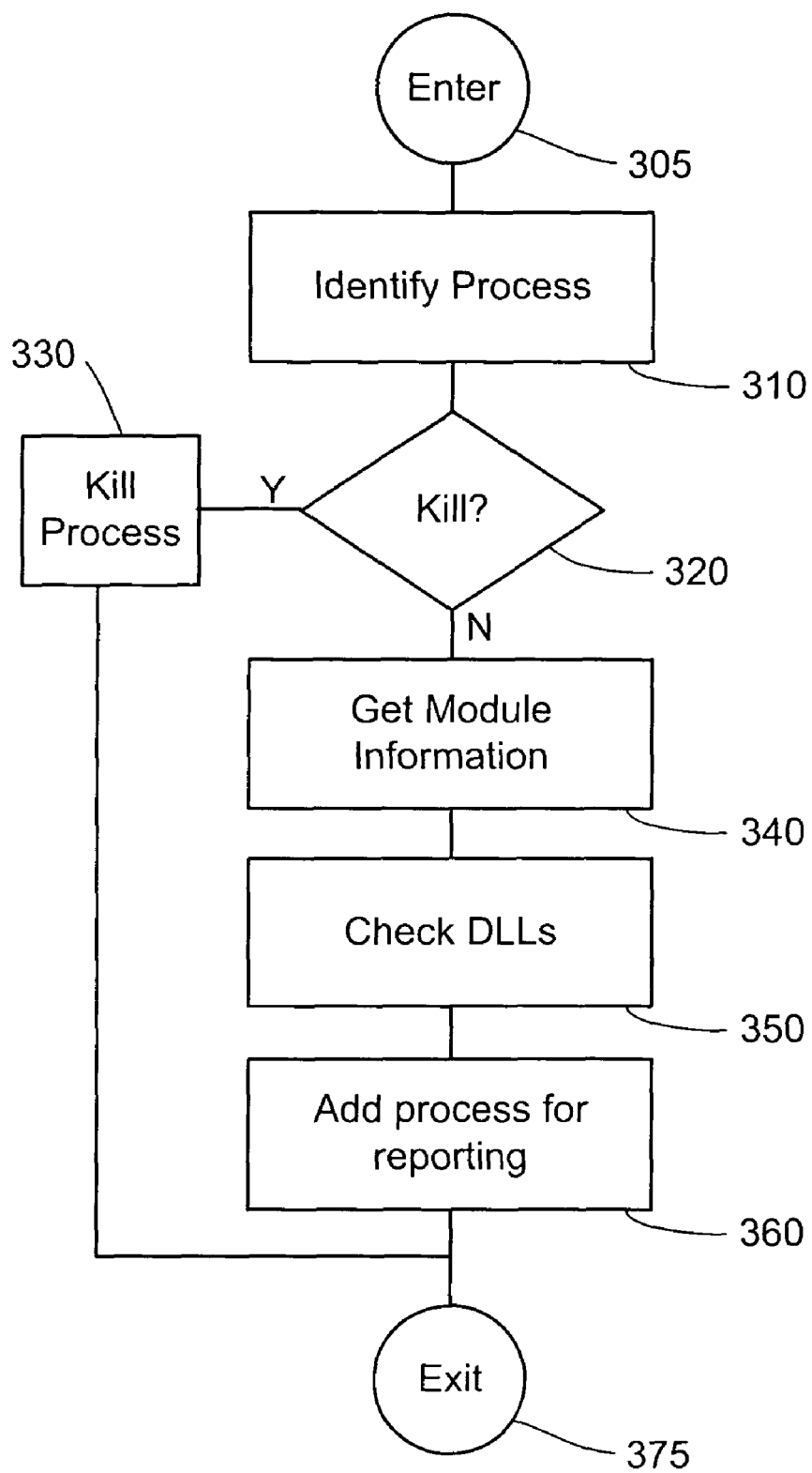
FIG. 3 is a flow diagram illustrating a method of evaluating a new process in the embodiment shown in FIG. 2.

FIG. 3 is a flow diagram illustrating a method of evaluating a new process in the embodiment shown in FIG. 2. The agent enters at step 305 and retrieves the process' executable name from the operating system in step 310. The executable name is compared to a list of names on a KILL list in step 320. The KILL list may include unauthorized or prohibited software or known malicious applications. If the process is found on the KILL list, the agent terminates the process in step 330 before exiting at step 375.

If the process is not on the KILL list, the agent proceeds to step 340 where the agent retrieves module information from the operating system. Module information includes basic information such as, for example, process ID, start time, user, and version. In step 350, the agent checks the Dynamic Link Libraries (DLL) that are referenced by the process. In step 360, the agent adds the process for reporting by gathering the module and DLL information retrieved in steps 340 and 350.

Figure 4:
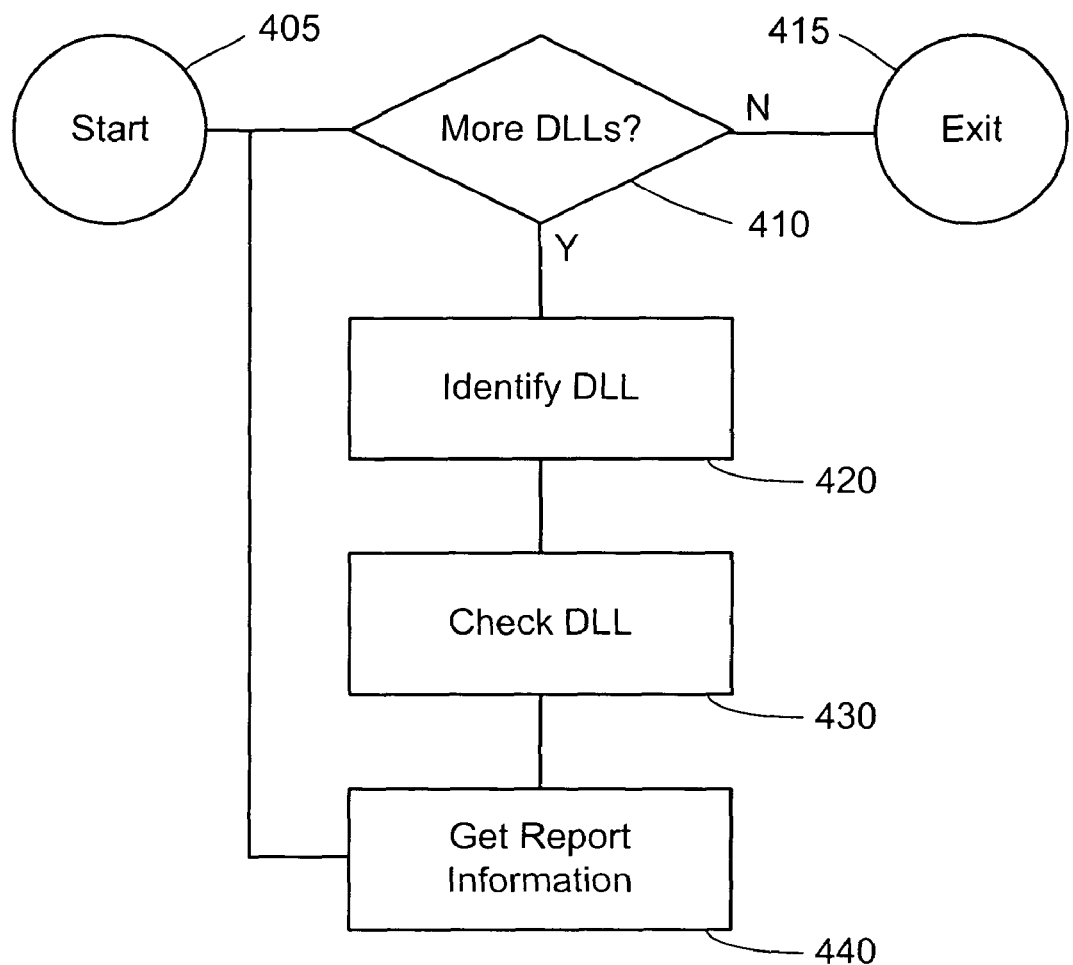
FIG. 4 is a flow diagram illustrating a method of evaluating a DLL in the embodiment shown in FIG. 3.

FIG. 4 is a flow diagram illustrating a method of evaluating one or more dynamic link libraries associated with the process in the embodiment shown in FIG. 3. The agent enters the method in step 405 and begins a loop that gathers information about each DLL associated with the process. In step 410, the agent determines if information has been gathered from each DLL associated with the process. If each DLL has been evaluated, the agent exits in step 415. For each DLL referenced by the process, the agent identifies the DLL in step 420 by retrieving the name of the DLL from the operating system.

In step 430, the agent evaluates the DLL by first determining if the configuration file has set a check DLL option. If the DLL option is not set, the agent does not check the DLLs referenced by the process and the agent exits at 415. If the check DLL option is set, the agent waits for a pre-determined period to allow the process to load its modules. The agent then checks the DLL against the restricted list and performs the corresponding restriction action if the DLL is on the restricted list. In an embodiment of the present invention, the configuration file includes a single restricted list containing both process executable names and DLL names along with one or more restriction actions associated with a specific name that are performed when that process or module starts on the local computer. For example, if the module name retrieved in step 420 is "XTUPDATE.DLL" and the restricted list includes an entry such as "XTUPDATE.DLL"ra="KILL_REPORT", the agent performs the restriction action or actions corresponding to the value; "KILL_REPORT," which in this example may be to terminate the DLL and report the termination to the central repository. The agent may also check the DLL against an ignore list in the configuration file. If the DLL name is on the ignore list, the agent jumps to the next DLL referenced by the process without gathering further information about the DLL. If the DLL is not on the ignore list, the agent, in step 440, retrieves information about the DLL that may be specified in the configuration file such as, for example, DLL path, file version, product name, machine name, and start date and time. After the DLL information has been gathered, the agent jumps to step 410 and continues the loop 410-420-430-440 until all DLLs referenced by the process have been evaluated.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications, and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A method comprising:
   running an agent program on a computer;
   identifying a new process executing on the computer;
   comparing a configuration file to a master configuration file for the computer to determine if the configuration file is updated;
   comparing the new process to a restricted list stored in the configuration file on the computer, each entry in the restricted list comprising a name of an executable and a restriction action, the restriction action being a termination of the execution of the new process; and
   performing the restriction action on the new process if the new process is on the restricted list and not on an ignore list, the step of comparing the configuration file to the master configuration file further including the steps of:
calculating a checksum for the configuration file, transmitting the checksum to a server,
receiving a copy of the master configuration file from the server if the transmitted checksum does not equal a checksum for the master configuration file, and
replacing the configuration file with the copy of the master configuration file.

2. The method of claim 1 further comprising transmitting a report to a central repository in communication with the computer after performing the restriction action thereby providing real-time computer usage to the central repository.

3. The method of claim 2 wherein the report includes a process ID.

4. The method of claim 2 wherein the report includes a start time.

5. The method of claim 2 wherein the report includes an executable name.

6. The method of claim 1, wherein the master configuration file is stored on the server in communication with the computer.

7. The method of claim 6 wherein communication between the computer and the server is via HTTP protocol on Port 80.

8. The method of claim 1 further comprising comparing the new process to the ignore list stored in the configuration file, the agent ignoring the new process if it is listed on the ignore list.

9. A system comprising:
a computer in communication with a server;
a configuration file stored on the computer, the configuration file including a restricted list, each entry in the restricted list comprising an executable name and a restriction action; and
an agent program executing on the computer, the agent configured to identify a new process executing on the computer by comparing the new process to the restricted list stored in the configuration file and perform the restriction action when the new process matches the executable name on the restricted list and is not on an ignore list, the restriction action being a termination of the execution of the new process,
the agent program further configured to compare the configuration file to a master configuration file for the computer to determine if the configuration file is updated,
wherein said compare the configuration file to the master configuration file further includes calculating a checksum for the configuration file, transmitting the checksum to the server, receiving a copy of the master configuration file from the server if the transmitted checksum does not equal a checksum for the master configuration file, and replacing the configuration file with the copy of the master configuration file.

10. The system of claim 9 wherein the master configuration file is stored on the server, the server configured to push the master configuration file to the computer when the configuration file stored on the computer is invalid.

11. The system of claim 9 further comprising a central repository, the central repository in communication with the computer and configured to receive a report from the computer, the reporting including information about the new process.

12. A computer program product stored on a non-transitory computer readable medium having thereon computer executable instructions that, when executed on a computer, configure the computer to perform a method comprising the steps of:
running an agent program;
identifying a new process executing;
comparing a configuration file to a master configuration file for the computer to determine if the configuration file is updated;
comparing the new process to a restricted list stored in the configuration file, each entry in the restricted list comprising a name of an executable and a restriction action, the restriction action being a termination of the execution of the new process; and performing a restriction action on the new process if the new process is on the restricted list and not on an ignore list,
the step of comparing the configuration file to the master configuration file further including the steps of:
calculating a checksum for the configuration file, transmitting the checksum to a server,
receiving a copy of the master configuration file from the server if the transmitted checksum does not equal a checksum for the master configuration file, and
replacing the configuration file with the copy of the master configuration file.

* * * * *